US010321584B2

(12) United States Patent
Choi et al.

(10) Patent No.: US 10,321,584 B2
(45) Date of Patent: Jun. 11, 2019

(54) DISPLAY DEVICE

(71) Applicant: Samsung Display Co., Ltd., Yongin-si, Gyeonggi-do (KR)

(72) Inventors: Jin Hwan Choi, Seoul (KR); Min-Sung Kim, Hwaseong-si (KR); Hyun Woo Koo, Hwaseong-si (KR); Jeong Ho Kim, Seoul (KR); Tae Woong Kim, Seongnam-si (KR); Tae An Seo, Hwaseong-si (KR); Jung Hun Lee, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/723,652

(22) Filed: Oct. 3, 2017

(65) Prior Publication Data
US 2018/0098440 A1 Apr. 5, 2018

(30) Foreign Application Priority Data

Oct. 4, 2016 (KR) .......................... 10-2016-0127734

(51) Int. Cl.
H05K 5/00 (2006.01)
G02F 1/1333 (2006.01)
G06F 1/16 (2006.01)

(52) U.S. Cl.
CPC ..... H05K 5/0017 (2013.01); G02F 1/133305 (2013.01); G06F 1/1652 (2013.01)

(58) Field of Classification Search
CPC ................ H05K 5/0017; G06F 1/1652; G02F 1/133305
USPC .................................................... 361/679.21
See application file for complete search history.

(56) References Cited

U.S. PATENT DOCUMENTS

| 4,064,503 | A | * | 12/1977 | Saylor | ................... | G09F 11/295 |
| | | | | | | 340/815.53 |
| 8,493,714 | B2 | | 7/2013 | Visser et al. | | |
| 8,711,566 | B2 | * | 4/2014 | O'Brien | ............... | G06F 1/1624 |
| | | | | | | 361/724 |
| 9,196,178 | B2 | * | 11/2015 | Van Lieshout | ... | G02F 1/133305 |
| 9,286,812 | B2 | | 3/2016 | Bohn et al. | | |
| 2008/0049003 | A1 | * | 2/2008 | Hasegawa | ............. | G06F 1/1615 |
| | | | | | | 345/206 |

(Continued)

FOREIGN PATENT DOCUMENTS

KR 10-2015-0014161 A 2/2015
KR 10-2016-0048283 A 5/2016

(Continued)

OTHER PUBLICATIONS

European Search Report corresponding to EP Application No. 17194317.8, dated Jun. 26, 2018, 9 pages.

Primary Examiner — Rockshana D Chowdhury
(74) Attorney, Agent, or Firm — Innovation Counsel LLP

(57) ABSTRACT

An exemplary embodiment provides a display device including: a display panel configured to include a first area, and a second area and a third area respectively disposed at opposite sides of the first area in a first direction; a first roller unit configured to wind the second area thereon; and a second roller unit configured to wind the third area of the display panel in an opposite direction to that of the first roller unit, wherein a distance between the first roller unit and the second roller unit which are separated from each other in the first direction can be adjusted.

14 Claims, 19 Drawing Sheets

(56) References Cited

U.S. PATENT DOCUMENTS

| | | | | |
|---|---|---|---|---|
| 2012/0033353 A1* | 2/2012 | Huang | .................. | G09F 9/33 |
| | | | | 361/679.01 |
| 2013/0058063 A1* | 3/2013 | O'Brien | ................ | G06F 1/1624 |
| | | | | 361/807 |
| 2016/0034000 A1 | 2/2016 | Lee et al. | | |
| 2016/0209879 A1 | 7/2016 | Ryu et al. | | |
| 2016/0216737 A1 | 7/2016 | Hayk et al. | | |

FOREIGN PATENT DOCUMENTS

| KR | 10-2016-0067272 A | 6/2016 |
|---|---|---|
| KR | 10-2016-0086998 A | 7/2016 |

* cited by examiner

FIG. 8
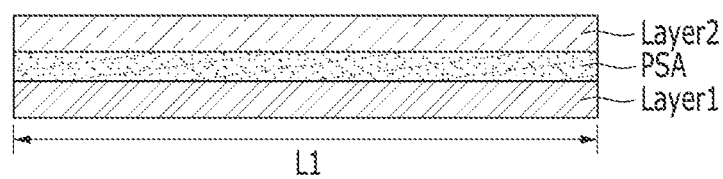
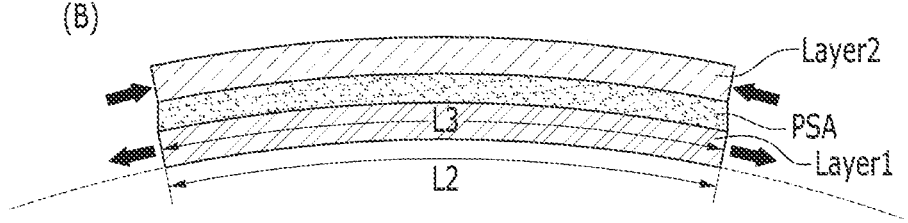

DISPLAY DEVICE

CROSS-REFERENCE TO RELATED APPLICATION

This application claims priority to and the benefit of Korean Patent Application No. 10-2016-0127734 filed in the Korean Intellectual Property Office on Oct. 4, 2016, the entire contents of which are incorporated herein by reference.

BACKGROUND

(a) Technical Field

The present disclosure relates to a display device.

(b) Description of the Related Art

Currently, as generally known display devices, there are a liquid crystal display (LCD), a plasma display panel (PDP), an organic light emitting diode (OLED) display, a field effect display (FED), an electrophoretic display, and the like.

Particularly, the OLED display includes two electrodes and an organic emission layer interposed therebetween. Electrons injected from one electrode and holes injected from the other electrode are combined in the organic emission layer to generate excitons, and the generated excitons release energy to emit light.

The OLED display may have a reduced thickness and weight since it has a self-luminance characteristic and does not require an additional light source, unlike the LCD. In addition, the OLED display is receiving attention as a next generation display device since it has high quality characteristics such as low power consumption, high luminance, and high response speed.

This display device has recently been under development as a flexible display device that can be rolled. In order to use the foldable display devices or the rollable display devices for a long time, it is necessary to minimize stress applied to the display panel thereof while they are used.

The above information disclosed in this Background section is only for enhancement of understanding of the background of the inventive concept and therefore it may contain information that does not form the prior art that is already known in this country to a person of ordinary skill in the art.

SUMMARY

The present inventive concept has been made in an effort to provide a display device that may prevent a display panel thereof from being broken due to stress.

An exemplary embodiment provides a display device including: a display panel configured to include a first area, and a second area and a third area respectively disposed at opposite sides of the first area in a first direction; a first roller unit configured to wind the second area thereon; and a second roller unit configured to wind the third area of the display panel in an opposite direction to that of the first roller unit, wherein the first roller unit and the second roller unit are separated from each other in the first direction by a distance, the first roller unit and the second roller unit configured to allow the distance to be adjusted.

The first roller unit may include: a first roller configured to rotate around a first rotation axis; and a second roller configured to rotate in an opposite direction to that of the first roller around a second rotation axis that is parallel to the first rotation axis in the first direction.

The second area of the display panel may be wound on at least one of external circumferential surfaces of the first roller and the second roller.

A first ratio which is a ratio of a first length of the second area wound around the external circumferential surface of the first roller to a length of a circumference of the first roller may be the same as a second ratio which is a ratio of a second length of the second area wound around the external circumferential surface of the second roller to a length of a circumference of the second roller.

A radius of the first roller may be a same radius as a radius of the second roller.

A radius of the first roller may be a different radius from a radius of the second roller.

The first roller unit may further include a first connection plate configured to have a first-side end portion fixedly coupled to the external circumferential surface of the second roller, and a second-side end portion coupled to the second area, and the first connection plate may be wound on the external circumferential surface of the first roller or the second roller.

The first roller unit may further include a third roller configured to rotate in an opposite direction to that of the second roller around a third rotation axis parallel to the first rotation axis and the second rotation axis.

The second roller unit may include: a fourth roller configured to rotate around a fourth rotation axis parallel to the first rotation axis in the first direction; and a fifth roller configured to rotate in an opposite direction to that of the fourth roller around a fifth rotation axis parallel to the fourth rotation axis in the first direction.

The third area may be wound on at least one of external circumferential surfaces of the fourth roller and the fifth roller.

A third ratio which is a ratio of a length of the display panel wound on the external circumferential surface of the fourth roller to a length of a circumference of the fourth roller may be the same as a fourth ratio which is a ratio of a length of the display panel wound on the external circumferential surface of the fifth roller to a length of a circumference of the fifth roller.

A radius of the fourth roller may be a same radius as a radius of the fifth roller.

A radius of the fourth roller may be a different radius from a radius of the fifth roller.

The second roller unit may further include a second connection plate configured to have a first-side end portion fixedly coupled to the external circumferential surface of the fifth roller, and a second-side end portion coupled to the third area, and the second connection plate may be wound on the external circumferential surface of the fourth roller or the fifth roller.

The second roller unit may further include a sixth roller configured to rotate in an opposite direction to that of the fifth roller around a sixth rotation axis parallel to the fourth rotation axis and the fifth rotation axis.

An exemplary embodiment provides a display device including: a display panel configured to include a first area, and a second area arranged close to the first area along a first direction in parallel; a fixing unit fixedly coupled to a first-side end portion of the first area; and a first winder configured to wind the second area of the display panel thereon, wherein the first winder includes: a first roller configured to rotate about a first rotation axis; and a second roller configured to rotate around a second rotation axis that is parallel to the first rotation axis in the first direction, the second area of the display panel is wound on external circumferential surfaces of the first roller and the second roller, the first roller and the second roller are separated from each other along the first direction by a distance, the first roller and the second roller configured to be movable along the first direction and allow the distance to be adjusted.

The first roller and the second roller may have a separation distance between a first distance which is a maximum distance between the first roller and the second roller which are separated from each other in the first direction and a second distance which is a minimum distance therebetween.

The first roller and the second roller may have the first distance therebetween, and may be moved along the first direction.

A distance between the first roller and the second roller may be reduced from the first distance to the second distance.

The second roller may be configured to be movable toward the first roller.

The first roller and the second roller may be configured to rotate in different directions.

The first roller and the second roller may be configured to rotate in a same direction.

A radius of the first roller may be a same radius as a radius of the second roller.

A radius of the first roller may be a different radius from a radius of the second roller.

An exemplary embodiment provides a display device including: a display panel configured to include a first area, and a second area arranged close to the first area along a first direction in parallel; a fixing unit fixedly coupled to a first-side end portion of the first area; and a second winder configured to wind the second area of the display panel thereon, wherein the second winder includes: a first roller configured to wind the second area of the display panel thereon; and a guide unit disposed in parallel with the first roller in the first direction, to allow the second area passing through the first roller to extend therethrough, wherein the first roller and the guide unit are separated from each other in the first direction by a distance, the first roller and the guide unit configured to allow the distance to be adjusted.

The guide unit may be formed of a tubular member through which the display panel is to be extended.

The guide unit may have a convex curved surface in one direction.

A through hole formed at opposite side end portions of the guide unit may be positioned in parallel with the first direction to face the first roller.

The first roller and the guide unit may have a separation distance between a first distance, which is a maximum distance between the first roller and the guide unit which are separated from each other in the first direction, and a second distance, which is a minimum distance therebetween.

The first roller and the guide unit may have the first distance therebetween, and are moved along the first direction.

A distance between the first roller and the guide unit may be reduced from the first distance to the second distance.

The guide unit may be configured to be movable toward the first roller.

According to an embodiment of the present inventive concept, it is possible to prevent a display panel of a display device from being broken due to stress.

BRIEF DESCRIPTION OF THE DRAWINGS

FIG. 8 illustrates a process of deforming an adhesive layer when a display device is bent.

DETAILED DESCRIPTION OF THE EMBODIMENTS

Figure 1:
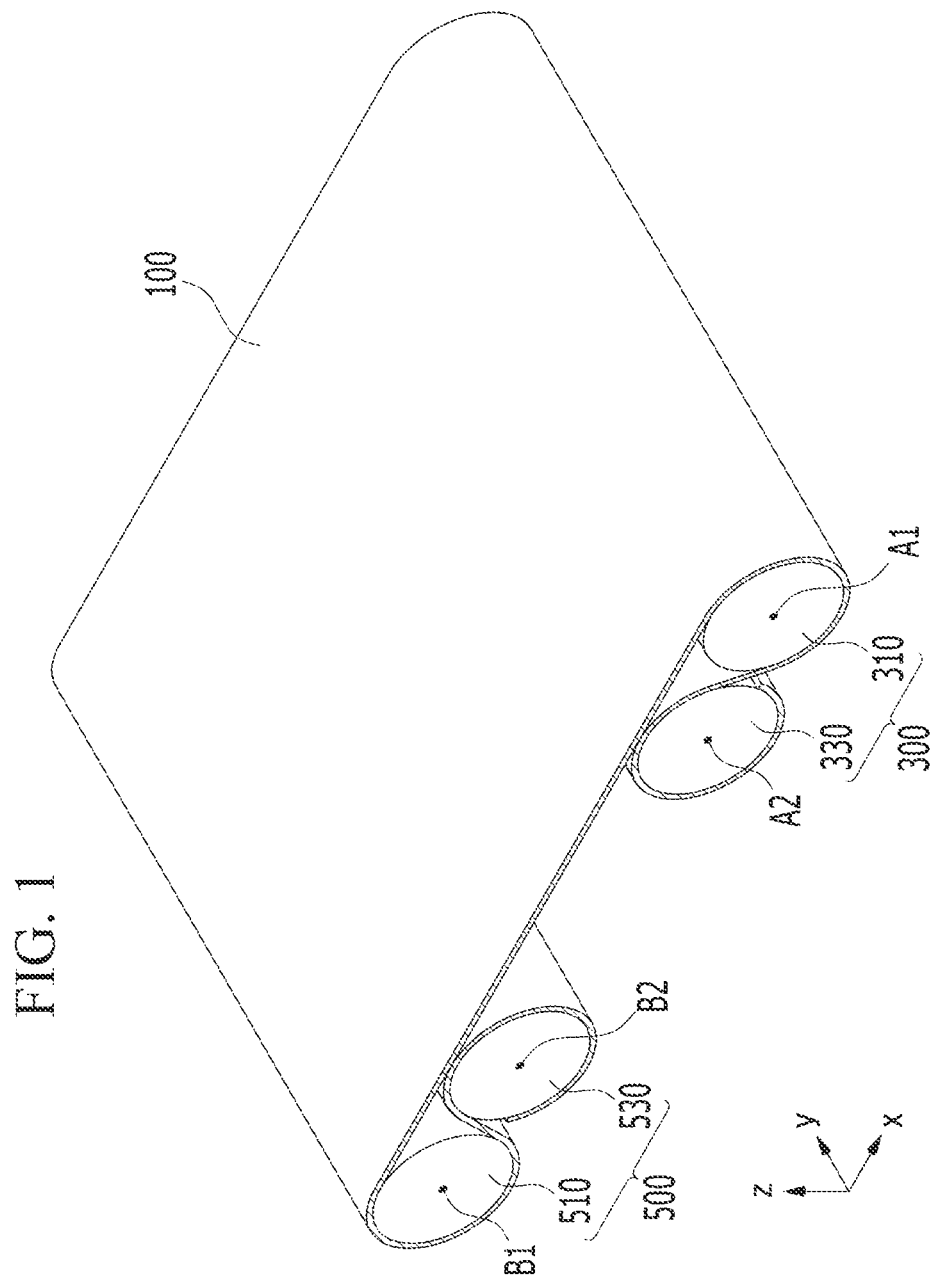
FIG. 1 is a schematic perspective view illustrating a first exemplary embodiment of the present inventive concept.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present inventive concept. The drawings and description are to be regarded as illustrative in nature and not restrictive. Like reference numerals designate like elements throughout the specification.

Further, since sizes and thicknesses of constituent members shown in the accompanying drawings are arbitrarily given for better understanding and ease of description, the present inventive concept is not limited to the illustrated sizes and thicknesses.

In the drawings, the thickness of layers, films, panels, regions, etc., are exaggerated for clarity. In the drawings, for better understanding and ease of description, the thicknesses of some layers and areas are exaggerated. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Further, in the specification, the word "on" means positioning on or below the object portion, but does not essentially mean positioning on the upper side of the object portion based on a gravity direction.

Hereinafter, a display device according to first exemplary embodiment will be described with reference to FIG. 1 to FIG. 6.

Figure 2:
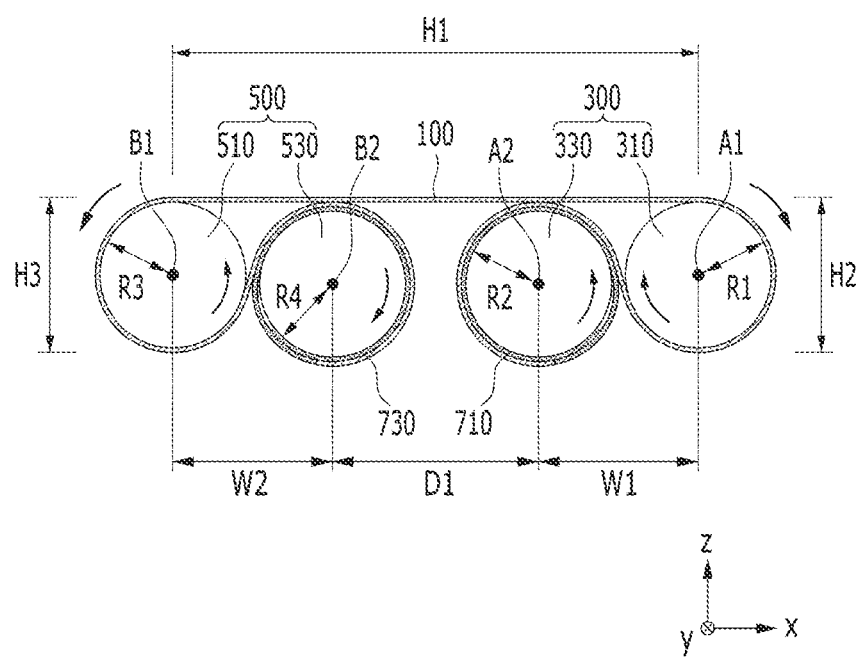
FIG. 2 and FIG. 3 illustrate an operation of FIG. 1.
Figure 3:
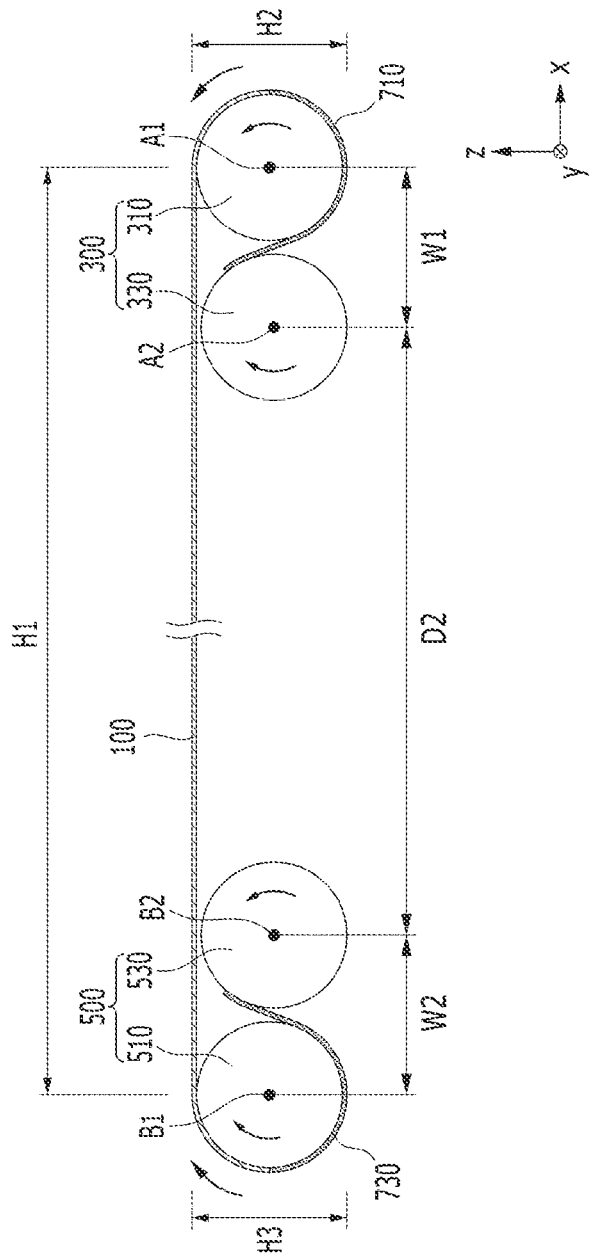
Figure 4:
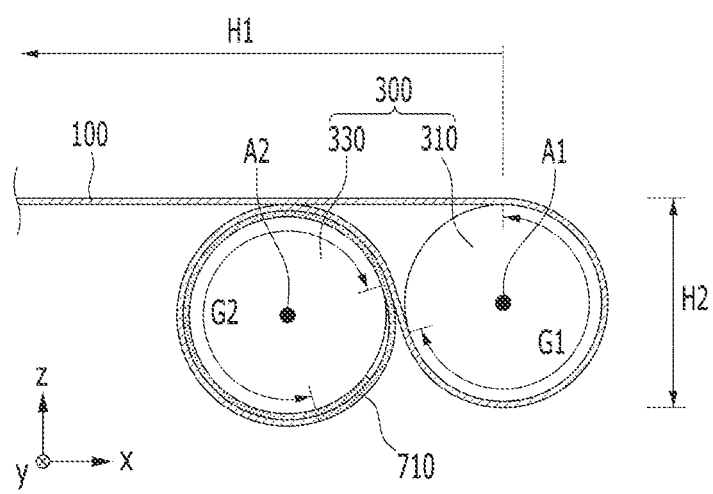
FIG. 4 is an enlarged view illustrating a first roller unit of FIG. 2.
Figure 5:
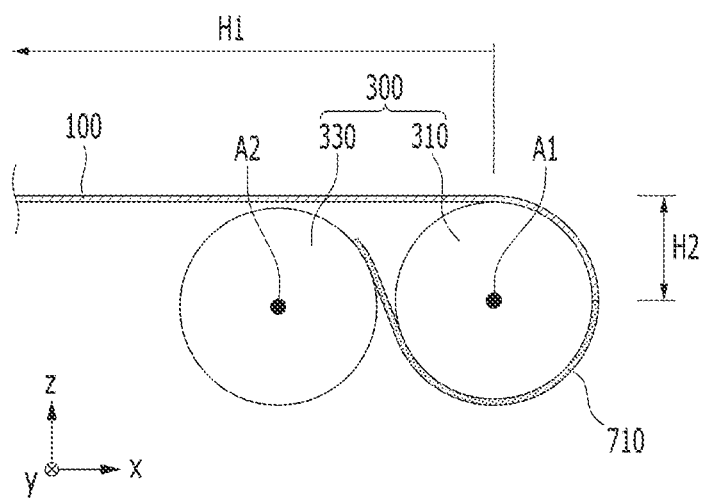
FIG. 5 is an enlarged view illustrating a first roller unit of FIG. 3.
Figure 6:
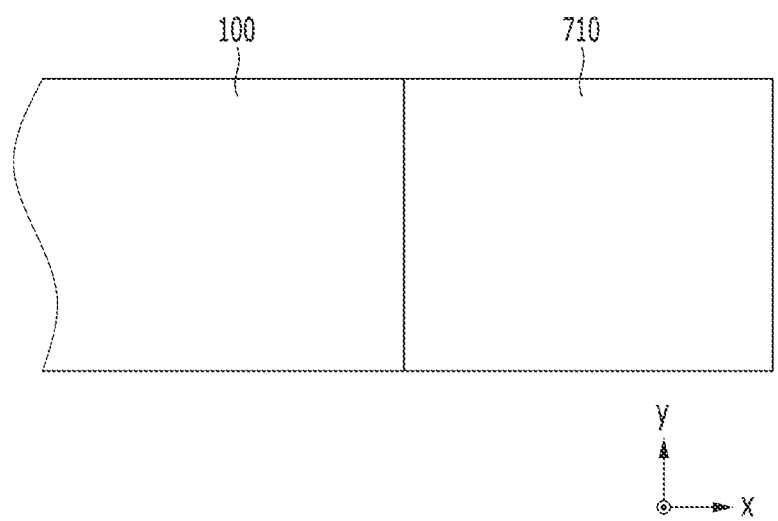
FIG. 6 illustrates a coupling relationship between the display panel and the first connection plate.

FIG. 1 is a schematic perspective view illustrating a first exemplary embodiment of the present inventive concept, and FIG. 2 and FIG. 3 illustrate an operation of FIG. 1. FIG. 4 is an enlarged view illustrating a first roller unit of FIG. 2, FIG. 5 is an enlarged view illustrating a first roller unit of FIG. 3, and FIG. 6 illustrates a coupling relationship between the display panel and the first connection plate.

Referring to FIG. 1 to FIG. 3, the display device according to the present exemplary embodiment may include a display panel 100, a first roller unit 300, and a second roller unit 500. In the present exemplary embodiment, opposite end portions of the display panel 100 may be wound around the first roller unit 300 and the second roller unit 500, respectively. In this case, at least two rollers for winding the display panel 100 may be respectively disposed in the first roller unit 300 and the second roller unit 500, and adjacent rollers may rotate in different directions.

The display panel 100 may display images by emitting light. In this case, the display panel 100 may be applicable not only to a display panel of an organic light emitting diode (OLED) display, but also to a liquid crystal display (LCD), a plasma display (PDP), a field emission display (FED), an electrophoretic display, or the like, which may be used as a display panel.

The display panel 100 can be divided into a display area for displaying an image and a peripheral area. The display area serves to display an image, and a plurality of pixels may be disposed therein.

The peripheral area is an area other than the display area in which the pixels are disposed, and a drive signal line (not illustrated), a drive unit (not illustrated), and the like necessary for driving the display area may be disposed therein.

Meanwhile, in the present exemplary embodiment, the display panel 100 may be divided into a first area H1, a second area H2, and a third area H3. The first area H1, the second area H2, and the third area H3 may be disposed in a first direction (X-axis), and the first area H1 is a virtual area positioned in the center of the display panel 100. In addition, the second area H2 and the third area H3 represent virtual areas positioned at opposite end portions of the first area H1. The first area H1 is mainly formed of the display area, and the second area H2 and the third area H3 are formed of the display area and the peripheral area.

In the present exemplary embodiment, when the display panel 100 is wound around the first roller unit 300 and the second roller unit 500, the first area H1 may indicate a virtual area that is not wound around the first roller unit 300 and the second roller unit 500. Further, the second area H2 and the third area H3 may indicate areas that can be wound around the first roller unit 300 and the second roller unit 500, respectively. In this case, lengths of the second area H2 and the third area H3 that are wound on the first roller unit 300 and the second roller unit 500 may be varied depending on operation states of the first roller unit 300 and second roller unit 500.

The first roller unit 300 may wind the second area H2 of the display panel 100 thereon. The first roller unit 300 may wind the second area H2 around a second direction (Y-axis) in a clockwise direction. In contrast, the second roller unit 500 may wind the third area H3 around the second direction (Y-axis) in a counterclockwise direction.

In this case, the first roller unit 300 includes a first roller 310 and a second roller 330. The first roller 310 and the second roller 330 may be cylindrical members and may extend along the second direction (Y-axis). In the present exemplary embodiment, a radius R1 of the first roller 310 and a radius R2 of the second roller 330 may be equal to each other. However, the present inventive concept is not limited thereto. For example, the radius R1 of the first roller 310 and the radius R2 of the second roller 330 may be different from each other.

The first roller 310 can rotate about the first rotation axis A1 and the second roller 330 can rotate around the second rotation axis A2. The first rotation axis A1 and the second rotation axis A2 may be separated from each other in a first direction (X-axis), and the first rotation axis A1 and the second rotation axis A2 may be extended in the second direction (Y-axis).

The first rotation axis A1 and the second rotation axis A2 may be disposed apart from each other by a first axis-to-axis distance W1 along the first direction (X-axis). The first axis-to-axis distance W1 can be constantly maintained while the first roller 310 and the second roller 330 rotate to wind or unwind the second area H2 of the display panel 100.

In this case, the first roller 310 and the second roller 330 can rotate in opposite directions to each other. FIG. 2 illustrates a display device in which the display panel 100 is wound, or a state in which the display panel 100 is fully wound around the first roller unit 300 and the second roller unit 500. When the second area H2 of the display panel 100 is wound in the first roller unit 300, the first roller 310 may rotate clockwise around the second direction (Y-axis), and the second roller 330 may rotate counterclockwise around the second direction (Y-axis). As a result, when the first roller 310 and the second roller 330 rotate in opposite directions as described above, the second area H2 of the display panel 100 may be moved along the second roller 330 through the first roller 310.

As shown in FIG. 2 and FIG. 4, when the second area H2 of the display panel 100 is wound and stored in the first roller unit 300, the second area H2 may have curved surfaces wound in different directions at the same time. A part of the second area H2 is wound on an external circumferential surface of the first roller 310 and has a curved surface wound in the clockwise direction about the second direction (Y-axis), and a remaining part of the second area H2 may have a curved surface that is wound around an external circumferential surface of the second roller 330 and wound along the counterclockwise direction about the second direction (Y-axis).

As such, stress generated in the display panel 100 in the rollable display device that can be wound can be reduced when the second area H2 of the display panel 100 simultaneously has curved surfaces wound in different directions. A process of reducing the stress of the display panel 100 will be described later.

Meanwhile, referring to FIG. 4, when the second area H2 is wound around the first roller 310 and the second roller 330 to be stored, a first ratio RA1 which is a ratio of a first length G1 of the second area H2 wound around the external circumferential surface of the first roller 310 to a length of the circumference of the first roller 310 is the same as a second ratio RA2 which is a ratio of a second length G2 of the second area H2 wound around the external circumferential surface of the second roller 330 to a length of the circumference of the second roller 330.

When the radius R1 of the first roller 310 and the radius R2 of the second roller 330 are different from each other, the second area H2 may be wound around the external circumferential surface of the first roller 310 and the external circumferential surface of the second roller 330 to be stored such that the first ratio RA1 and the second ratio RA2 are equal to each other.

As in the present exemplary embodiment, when the radius R1 of the first roller 310 and the radius R2 of the second roller 330 are equal to each other, the second area H2 can be wound around the external circumferential surface of the first roller 310 and the external circumferential surface of the second roller 330 to be stored such that the first length G1 of the second area H2 wound around the external circumferential surface of the first roller 310 and the second length G2 of the second area H2 wound around the external circumferential surface of the second roller 330 are equal to each other.

The second roller unit 500 of the present exemplary embodiment may have a configuration that is symmetrical with the first roller unit 300 described above. The second roller unit 500 may include a fourth roller 510 and a fifth roller 530. The fourth roller 510 and the fifth roller 530 may be cylindrical members and may extend along a second direction (Y-axis). The radius R3 of the fourth roller 510 and the radius R4 of the fifth roller 530 may be equal to each other, like the first roller 310 and the second roller 330. However, the radius R3 of the fourth roller 510 and the radius R4 of the fifth roller 530 may be different from each other, without being limited thereto.

The fourth roller 510 can rotate about the fourth rotational axis B1, and the fifth roller 530 can rotate about the fifth rotational axis B2. The fourth rotation axis B1 and the fifth rotation axis B2 may be spaced apart from each other along the first direction (X-axis), and the fourth rotation axis (B1) may extend along the second direction (Y-axis).

The fourth rotation axis B1 and the fifth rotation axis B2 may be disposed apart from each other by a second axis-to-axis distance W2 along the first direction (X-axis). The second axis-to-axis distance W2 can be constantly maintained while the fourth roller 510 and the fifth roller 530 rotate to wind or unwind the third area H3 of the display panel 100.

The fourth roller 510 and the fifth roller 530 can rotate in opposite directions to each other. FIG. 2 illustrates a display device in which the display panel 100 is wound, i.e., a state in which the display panel 100 is fully wound around the first roller unit 300 and the second roller unit 500. When the third area H3 of the display panel 100 is wound in the second roller unit 500, the fourth roller 510 may rotate counterclockwise around the second direction (Y-axis), and the fifth roller 530 may rotate clockwise around the second direction (Y-axis). As a result, when the fourth roller 510 and the fifth roller 530 rotate in opposite directions as described above, the third area H3 of the display panel 100 may be moved along the fifth roller 530 through the fourth roller 510.

As shown in FIG. 2 and FIG. 4, when the third area H3 of the display panel 100 is wound and stored in the second roller unit 500, like the first roller unit 300, the third area H3 may have curved surfaces wound in different directions at the same time. A part of the third area H3 is wound on an external circumferential surface of the fourth roller 510 and has a curved surface wound in the counterclockwise direction about the second direction (Y-axis), and a remaining part of the third area H3 may have a curved surface that is wound around an external circumferential surface of the fifth roller 530 and wound along the clockwise direction about the second direction (Y-axis).

As such, stress generated in the display panel 100 in the rollable display device that can be wound can be reduced when the third area H3 of the display panel 100 simultaneously has curved surfaces wound in different directions.

Meanwhile, similar to the second area H2, when the third area H3 is wound around the fourth roller 510 and the fifth roller 530 to be stored, a third ratio (not illustrated) which is a ratio of a third length (not illustrated) of the third area H3 wound around the external circumferential surface of the fourth roller 510 to a length of the circumference of the fourth roller 510 is the same as a fourth ratio (not illustrated) which is a ratio of a fourth length (not illustrated) of the third area H3 wound around the external circumferential surface of the fifth roller 530 to a length of the circumference of the fifth roller 530.

When the radius R3 of the fourth roller 510 and the radius R4 of the fifth roller 530 are different from each other, the third area H3 may be wound around the external circumferential surface of the fourth roller 510 and the external circumferential surface of the fifth roller 530 to be stored such that the third ratio (not illustrated) and the fourth ratio (not illustrated) are equal to each other.

As in the present exemplary embodiment, when the radius R3 of the fourth roller 510 and the radius R4 of the fifth roller 530 are equal to each other, the third area H3 can be wound around the external circumferential surface of the fourth roller 510 and the external circumferential surface of the fifth roller 530 to be stored such that the third length of the third area H3 wound around the external circumferential surface of the fourth roller 510 and the fourth length of the third area H3 wound around the external circumferential surface of the fifth roller 530 are equal to each other.

FIG. 3 and FIG. 5 illustrate the display device in which the display panel 100 is unfolded. As shown in FIG. 3, when the second area H2 of the display panel 100 is unwound from the first roller unit 300, the first roller 310 may rotate counterclockwise about the second direction (Y-axis), and the second roller 330 may rotate clockwise about the second direction (Y-axis). As a result, when the first roller 310 and the second roller 330 are rotated in opposite directions as described above, the second area H2 of the display panel 100 may be moved along the first roller 310 through the second roller 330.

In this case, the fourth roller 510 may rotate in the clockwise direction about the second direction (Y-axis), and the fifth roller 530 may rotate in the counterclockwise direction about the second direction (Y-axis). As a result, when the fourth roller 510 and the fifth roller 530 are rotated in opposite directions as described above, the third area H3 of the display panel 100 may be moved along the fourth roller 510 through the fifth roller 530.

In the present exemplary embodiment, as shown in FIG. 2 and FIG. 3, when the second area H2 and the third area H3 are wound around the first roller unit 300 and the second roller unit 500, respectively, the first roller unit 300 and the second roller unit 500 may be spaced apart from one another at a first distance D1. In contrast, the first roller unit 300 and the second roller unit 500 may be disposed apart from each other at a second distance D2 in a state where the display panel 100 is unfolded by releasing the second area H2 and the third area H3 from the first roller unit 300 and the second roller unit 500, respectively. Herein, the first distance D1 and the second distance D2 may indicate a length measured in parallel with the first direction (X-axis).

In the present exemplary embodiment, when the second area H2 and the third area H3 of the display panel 100 are wound or unwound by the first roller unit 300 and the second roller unit 500, an interval of the two roller units 300 and 500 may be adjusted. A distance between the first roller unit 300 and the second roller unit 500 can be adjusted between the first distance D1 and the second distance D2. Specifically, when the display panel 100 starts to be unfolded in a state where the display panel 100 is wound and stored, the distance between the first roller unit 300 and the second roller unit 500 can be increased from the first distance D1 to the second distance D2. In contrast, when the display panel 100 starts to be wound, an interval between the first roller unit 300 and the second roller unit 500 can be reduced from the second distance D2 to the first distance D1.

Referring to FIG. 4 to FIG. 6, in the present exemplary embodiment, a first connection plate 710 can be coupled to an end portion of the second area H2 of the display panel 100. The first connection plate 710 may be in the shape of a plate, a first end of which is coupled to the second area H2, and a second end of which is fixedly coupled to the second roller 330. In this case, the first connection plate 710 may include an elastic material, and may be made of, for example, rubber. However, the material of the first connection plate 710 is not limited thereto, and it may be made of a known material having elasticity.

When the second area H2 is wound inside the first roller unit 300, the first connecting plate 710 can guide the second area H2 to be wound on the second roller 330 through the first roller 310. As shown in FIG. 5, the second area H2 of the display panel 100 may be positioned only on the external circumferential surface of the first roller 310 in a state in which the display panel 100 is unfolded. Then, when the display panel 100 is wound, the second area H2 must move along the external circumferential surface of the second roller 330 via the external circumferential surface of the first roller 310, as described above. In this case, the first connection plate 710 may be coupled to an end portion of the second area H2, to guide the second area H2 to be wound along the external circumferential surface of the second roller 330 around the second direction (Y-axis) in the counterclockwise direction. Meanwhile, a second connection plate 730 applied to the second roller unit 500 has a symmetric configuration with respect to the first connection plate 710, and thus a detailed description of the second connection plate 730 will be omitted.

Although each of the first roller unit 300 and the second roller unit 500 of FIGS. 1 to 3 has been described as including two rollers, the present inventive concept is not limited thereto. In a first modification shown in FIG. 7, each of the roller portion 300 and the second roller portion 500 may include three rollers. However, the present inventive concept is not limited thereto. For example, each of the first roller unit 300 and the second roller unit 500 may include four or more rollers.

Figure 7:
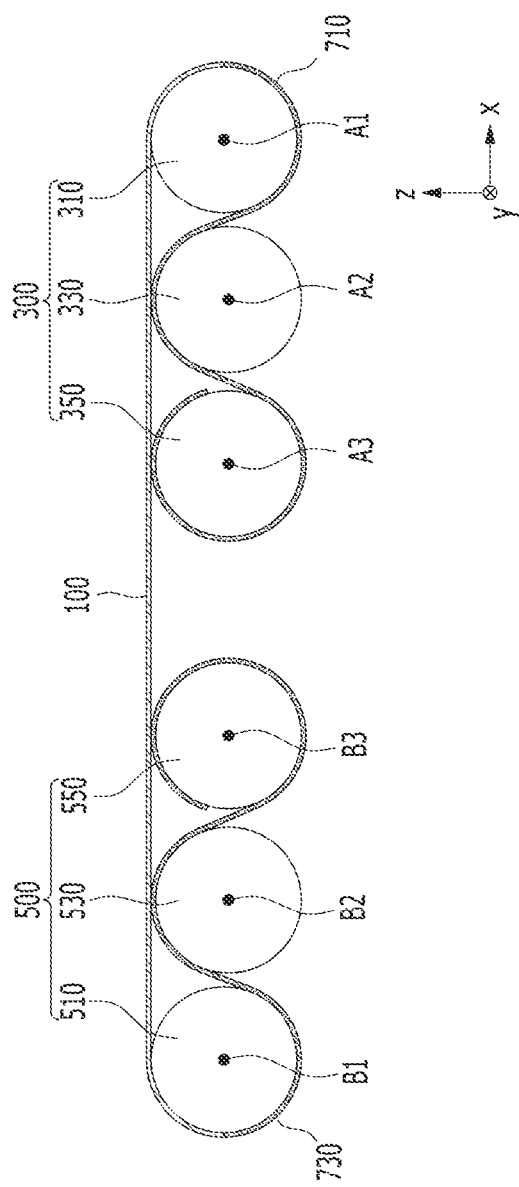
FIG. 7 illustrates a first modification of the display device of FIG. 1.

Referring to FIG. 7, the first roller unit 300 may include the first roller 310, the second roller 330 and a third roller 350. Similar to the first roller 310 and the second roller 330, the third roller 350 may be formed as a cylindrical member, and may be extended in the second direction (Y-axis). In this case, the first roller 310, the second roller 330, and the third roller 350 may be arranged in order along the first direction (X axis).

Further, in the present exemplary embodiment, the radiuses of the first roller 310, the second roller 330, and the third roller 350 may all be the same. However, the present inventive concept is not limited thereto. For example, the radiuses of the first roller 310, the second roller 330, and the third roller 350 may all be different from each other. Alternatively, the radiuses of two of the first roller 310, the second roller 330, and the third roller 350 may be the same, but may be different from the other roller.

The first roller 310 may rotate about a first rotation axis A1, the second roller 330 may rotate about a second rotation axis A2, and the third roller 350 may rotate about a third rotation axis A3. The first rotation axis A1, the second rotation axis A2, and the third rotation axis A3 may be spaced apart from each other along the first direction (X axis), and the first rotation axis A1, the second rotation axis A2, the third rotation axis A3 may extend along the second direction (Y axis).

In this case, adjacent ones of the first roller 310, the second roller 330, and the third roller 350 may rotate in different directions. For example, the first roller 310 rotates clockwise about the second direction (Y-axis), the second roller 330 rotates counterclockwise about the second direction (Y-axis), and the third roller 350 rotates clockwise about the second direction (Y-axis).

Meanwhile, a sixth roller 550 of the second roller unit 500 according to the present modification rotates about a sixth rotational axis B3 and is symmetric with respect to the third roller 350 of the first roller unit 300, and thus a detailed description of the sixth roller 550 will be omitted.

Hereinafter, a process of reducing stress generated to the display panel 100 when the display panel 100 simultaneously has curved surfaces which are wound in different directions will be described with reference to FIG. 8.

FIG. 8 illustrates a process of deforming an adhesive layer when the display device is bent.

As illustrated in FIG. 8 (A), it is assumed that a display panel applicable to a rollable display device has a structure in which a first substrate Layer1, an adhesive layer PSA, and a second substrate Layer2 are stacked. In other words, it may be described that the rollable display device has a structure in which two layers are disposed at an upper portion and a lower portion of the adhesive layer PSA. In this case, it is assumed that lengths of the first substrate Layer1, the adhesive layer PSA, and the second substrate Layer2 are all L1. Each of the first substrate Layer 1 and the second substrate Layer 2 can be a TFT layer, a light-emitting layer, a TSP layer, a polarizing layer, or the like located in the display panel.

As illustrated in FIG. 8 (B), when the display panel of FIG. 8 (A) is bent at a constant curvature, the first substrate Layer 1, the adhesive layer PSA, and the second substrate Layer 2 may be convexly bent in one direction.

When the display panel is bent at a constant curvature, a length of a bottom surface of the first substrate Layer1 may be contracted to L2 that is smaller than L1. A length of an upper surface of the first substrate Layer1 may be extended to L3 that is larger than L1. In this case, as illustrated in FIG. 8 (B), a tensile force may be generated in a top surface of the first substrate Layer1 in a direction of the bold arrows. In FIG. 8 (B), the length of L2 and L3 indicate an arc length.

The length of the bottom surface of the adhesive layer PSA contacting the top surface of the first substrate Layer1 may be L3, but the length of the top surface of the adhesive layer PSA may be smaller than L3. Since the adhesive layer PSA is made of a relatively soft adhesive material, unlike the first substrate Layer 1 and the second substrate layer 2, the length of the top surface and the bottom surface of the adhesive layer PSA may vary when the adhesive layer PSA is bent.

Accordingly, a tensile force may be generated in the vicinity of the bottom surface of the adhesive layer PSA, and a compressive force may be generated in the vicinity of the top surface of the adhesive layer PSA.

As a result, as illustrated in FIG. 8 (B), a compressive force acts on the lower surface of the second substrate Layer 2 in the direction of the bold arrows. Specifically, when the sequentially stacked structure is bent, a compressive force may be generated at the second substrate Layer2 which is disposed at an upper side of the adhesive layer PSA, and a tensile force may be generated at the first substrate Layer1 which is disposed at a lower side of the adhesive layer PSA. Accordingly, stress may be generated at the first substrate Layer1 and the second substrate Layer2 to separate the adhesive layer PSA and the first substrate Layer1 from each other, or the adhesive layer PSA and the second substrate Layer2 from each other.

However, when the display panel of FIG. 8 (A) in which the first substrate Layer1, the adhesive layer PSA and the second substrate Layer2 are sequentially stacked is bent in different directions, the aforementioned compressive and tensile forces acting on the display panel may cancel each other.

As a result, in the present exemplary embodiment, the stress generated in the second area H2 of the display panel 100 may be reduced or dispersed when the second area H2 of the display panel 100 simultaneously has curved surfaces wound in different directions.

Although the second roller unit 500 of FIGS. 1 to 3 has been described as including two rollers, the present inventive concept is not limited thereto. In a second modification shown in FIG. 9 and FIG. 10, the second roller portion 500 may only include one roller.

Figure 9:
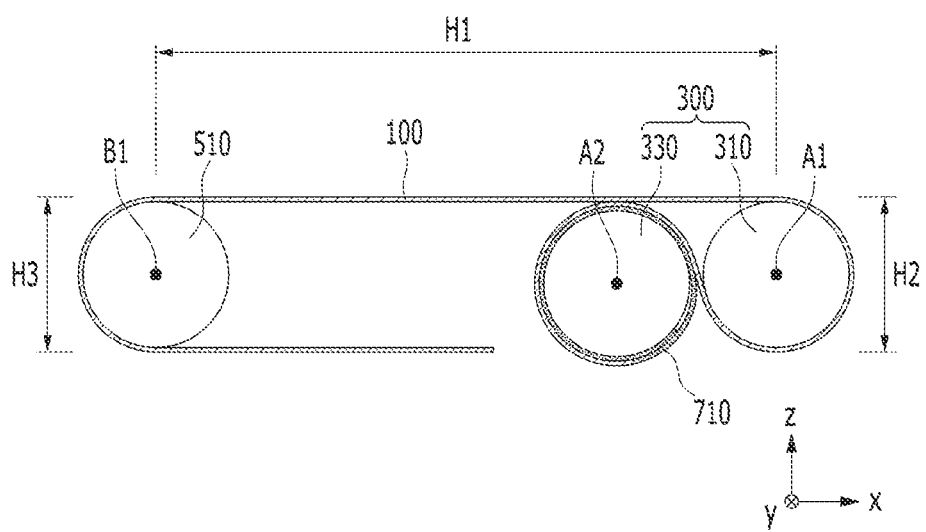
FIG. 9 and FIG. 10 illustrate an operation of a second modification of the display device of FIG. 1.
Figure 10:
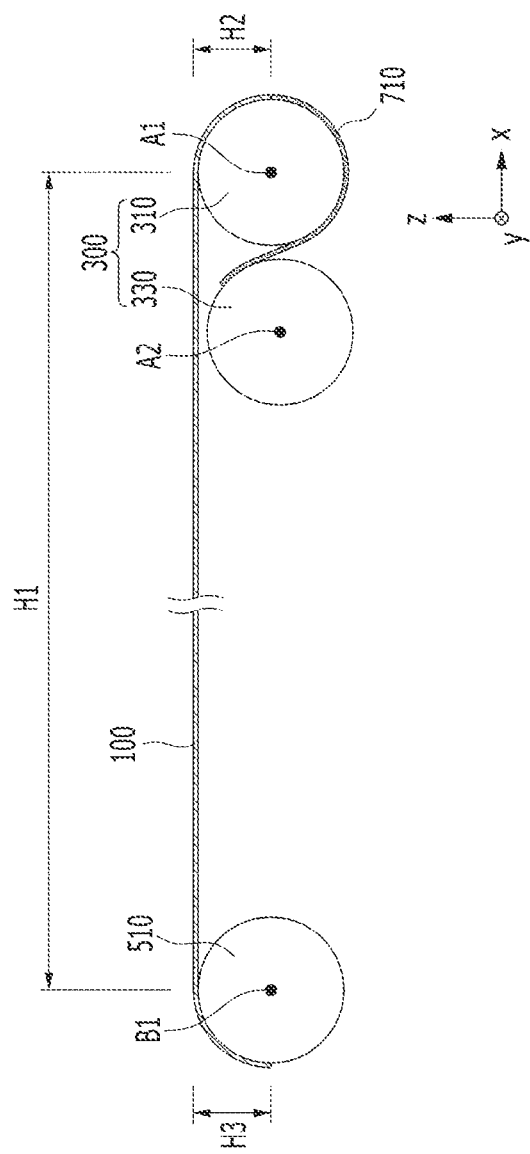

Referring to FIG. 9 and FIG. 10, the second roller unit 500 may only include the fourth roller 510. The fourth roller 510 rotates clockwise or counterclockwise about the second direction (Y axis) to wind or unwind the third area H3 of the display panel 100.

Specifically, as shown in FIG. 9, when the third area H3 of the display panel 100 is stored in the second roller unit 510, the fourth roller 510 rotates counterclockwise about the second direction (Y-axis) to store the third area H3 behind the second roller unit 500. Conversely, as shown in FIG. 10, when the third area H3 of the display panel 100 is unwound from the second roller unit 500, the fourth roller 510 rotates in the clockwise direction about the second direction (Y-axis) so that the third area H3 can be discharged from the second roller unit 500.

Hereinafter, a display device according to a second exemplary embodiment will be described with reference to FIG. 11 to FIG. 13. A detailed description related to configurations that are the same as in the aforementioned first exemplary embodiment will be omitted in describing the second exemplary embodiment.

Figure 11:
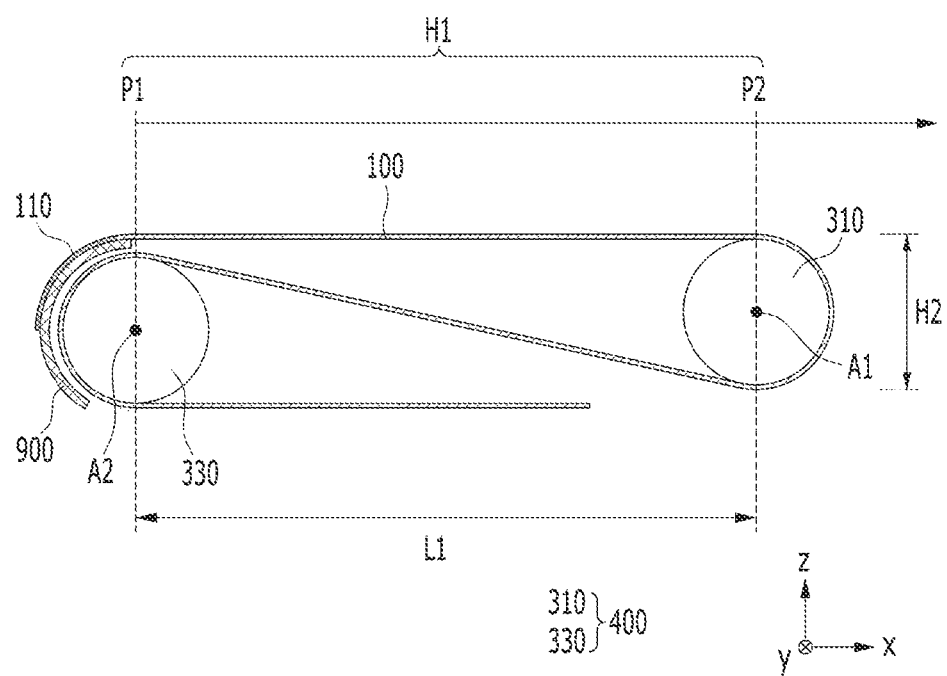
FIG. 11, FIG. 12 and FIG. 13 illustrate an operation of a display device according to a second exemplary embodiment of the present inventive concept.
Figure 12:
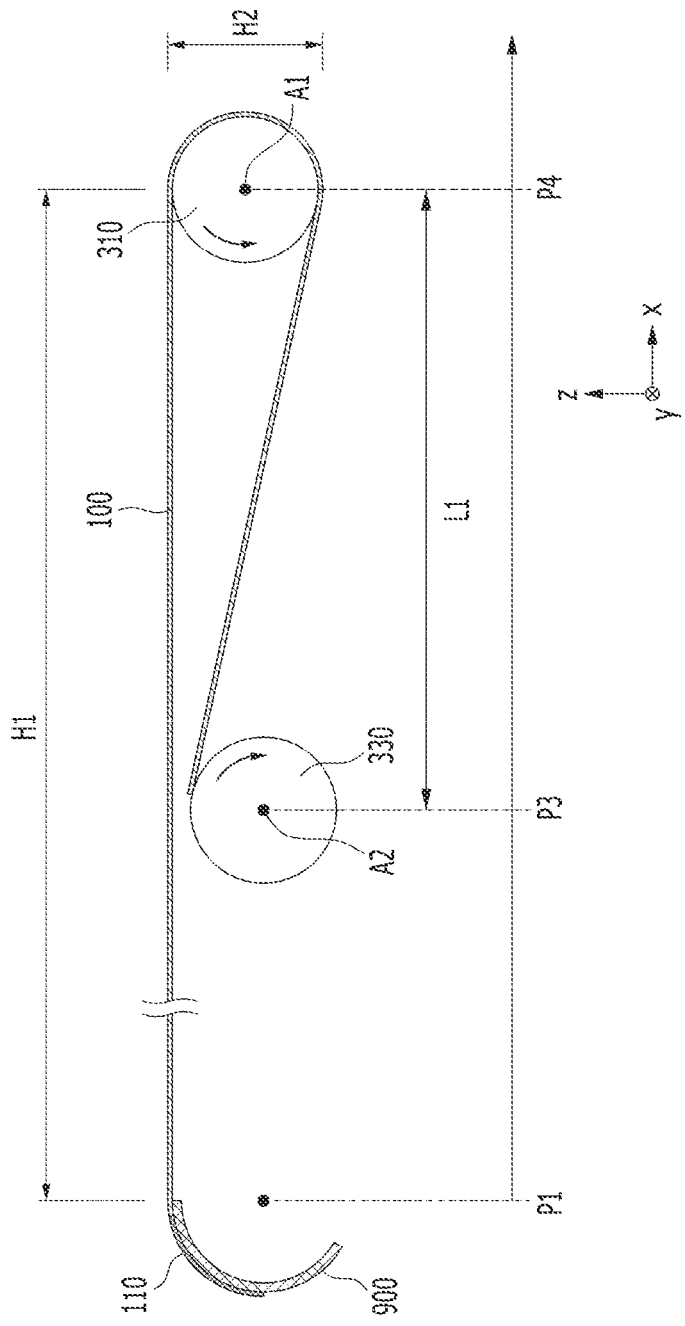
Figure 13:
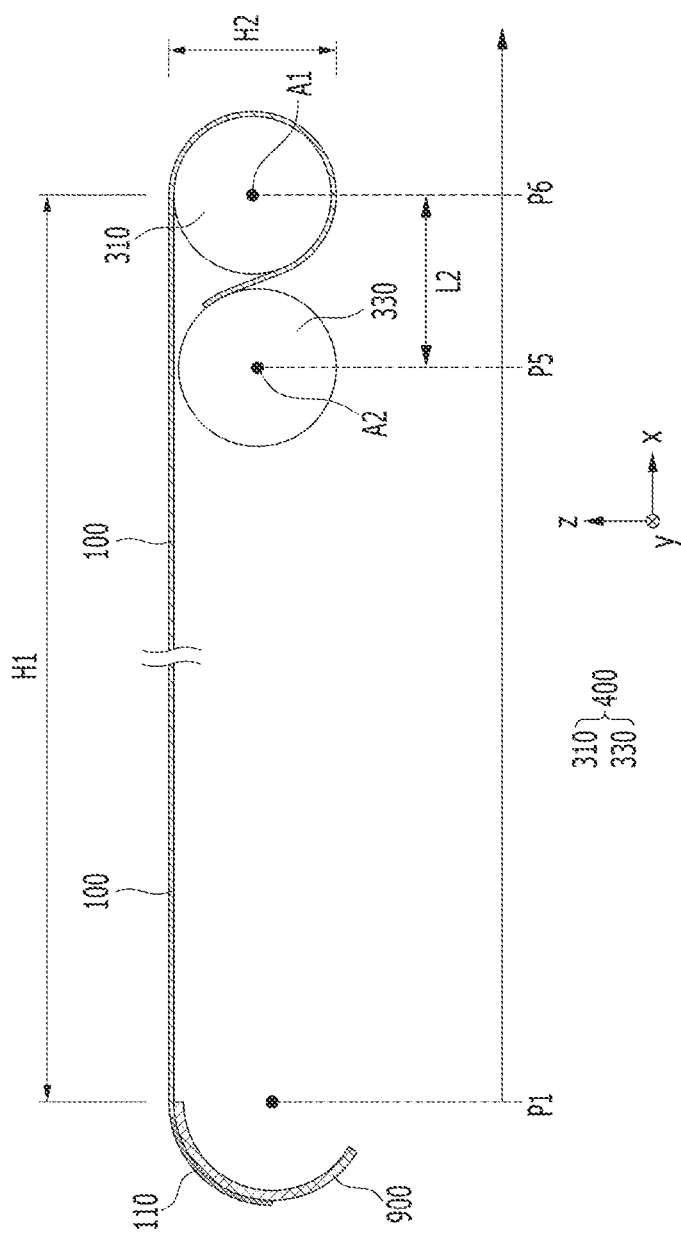

FIG. 11 to FIG. 13 illustrate an operation of a display device according to a second exemplary embodiment of the present inventive concept.

Referring to FIG. 11 to FIG. 13, the display device according to the present exemplary embodiment includes a display panel 100, a fixing unit 900, and a first winder 400. In the present exemplary embodiment, the end of the first area H1 of the display panel 100 is fixedly coupled to the fixing unit 900, and the second area H2 of the display panel 100 may be wound around the first winder 400. In this case, the first roller 310 and the second roller 330 are arranged side by side along the first direction (X-axis), and an interval between the first roller 310 and the second roller 330 can be adjusted when the second area H2 of the display panel 100 is wound or unwound on the first winder 400. In addition, the first roller 310 and the second roller 330 may move along the first direction (X-axis) when the second area H2 of the display panel 100 is wound or unwound by the first winder 400.

The display panel 100 may be divided into a first area H1 and a second area H2. The first area H1 and the second area H2 may be disposed in parallel along the first direction (X-axis). The first area H1 may represent a virtual area that is not wound on the first winder 400 when the display panel 100 is wound. The first area H1 may mainly include the above-described display area.

The second area H2 may represent an area that can be wound on the first winder 400. In this case, a length of the second area H2 wound on the first winder 400 may vary depending on the operating state of the first winder 400.

In the present exemplary embodiment, a first end of the first area H1 of the display panel 100 may be fixedly coupled to the fixing unit 900. The fixing unit 900 serves to fix the first end of the first area H1 so as to not move, and a peripheral area 110 coupled to the first end of the first area H1 of the display panel 100 may be disposed in the fixing unit 900. Herein, as described above, a driving unit and the like necessary for driving the first area H1 capable of displaying an image may be disposed in the peripheral area 110.

The first winder 400 may include a first roller 310 and a second roller 330. The first roller 310 and the second roller 330 may be cylindrical members and may extend along the second direction (Y-axis). In the present exemplary embodiment, a radius R1 of the first roller 310 and a radius R2 of the second roller 330 may be equal to each other. However, the present inventive concept is not limited thereto. For example, the radius R1 of the first roller 310 and the radius R2 of the second roller 330 may be different from each other.

The first roller 310 can rotate about the first rotation axis A1 and the second roller 330 can rotate around the second rotation axis A2. In this case, the first rotation axis A1 and the second rotation axis A2 may be extended in the second direction (Y-axis).

In the present exemplary embodiment, the first roller 310 and the second roller 330 can rotate in opposite directions to each other. FIG. 11 to FIG. 13 sequentially illustrate a process in which the display panel 100 is unwound from the first winder 400. In this process, the first roller 310 may rotate in the counterclockwise direction about the second direction (Y-axis), and the second roller 330 may rotate in the clockwise direction about the second direction (Y-axis). Conversely, when the display panel 100 is wound on the first winder 400, the first roller 310 may rotate clockwise about the second direction (Y-axis), and the second roller 330 may rotate counterclockwise about the second direction (Y-axis).

An operation of the display device according to the present exemplary embodiment will be described with reference to FIG. 11 to FIG. 13.

FIG. 11 illustrates a state in which the second area H2 of the display panel 100 is maximally wound inside the first winder 400. In this case, a part of the second area H2 is wound clockwise around the second direction (Y-axis) on the external circumferential surface of the first roller 310, and the other part of the second area H2 is wound counterclockwise around the second direction (Y-axis) on the external circumferential surface of the second roller 330.

In this case, a first distance L1 between the first roller 310 and the second roller 330, i.e., a distance between the first rotation axis A1 of the first roller 310 and the second rotation axis A2 of the second roller 330 which are separated from each other in the first direction (X-axis), may be constantly maintained. The first distance L1 may be a maximum distance that the first roller 310 and the second roller 330 are spaced apart from each other along the first direction (X axis).

As shown in FIG. 11, the second roller 330 and the first roller 310 may be respectively disposed at a first position P1 and a second position P2. Hereinafter, second to fifth positions indicate arbitrary positions away from the first position P1 along the first direction (X-axis) with reference to the first position P1.

As illustrated in FIG. 12, when the display panel 100 that is fully wound inside the first winder 400 of FIG. 11 starts to be unfolded, the first roller 310 and the second roller 330 can move to the right along the first direction (X axis) while maintaining the first distance L1.

In this process, the second roller 330 may move from the first position P1 to a third position P3, and the first roller 310 may move from the second position P2 to a fourth position P4. While the first roller 310 and the second roller 330 move to the fourth position P4 and the third position P3 respectively, the first interval L1, i.e., the distance between the first roller 310 and the second roller 330, can be constantly maintained.

In addition, while the first roller 310 and the second roller 330 move to the fourth position P4 and the third position P3, respectively, the first roller 310 may rotate in the counterclockwise direction about the second direction (Y axis), and the second roller 330 may rotate in the clockwise direction about the second direction (Y axis)

In this case, when the first roller 310 reaches the fourth position P4, a minimum area of the second area H2 of the display panel 100 is attached to an external circumferential surface of the second roller 330. Herein, the minimum area may represent an area such that the second area H2 can be attached without falling off the external circumferential surface of the second roller 330.

Next, as shown in FIG. 13, the second roller 330 may move from the third position P3 to a fifth position P5 and the first roller 310 may move from the fourth position P4 to a sixth position P6. However, while the display panel 100 shown in FIG. 12 is changed to the display panel 100 shown in FIG. 13, the distance between the first roller 310 and the second roller 330 is reduced from the first distance L1 to the second distance L2.

As a result, while the second roller 330 moves from the third position P3 to the fifth position P5, the second roller 330 approaches the first roller 310. When the distance between the first roller 310 and the second roller 330 reaches the second gap L2, the first roller 310 and the second roller 330 are no longer moved in the first direction (X axis).

In addition, while the first roller 310 is moved from the fourth position P4 to the sixth position P6, the first roller 310 may rotate counterclockwise about the second direction (Y axis). While the second roller 330 is moved from the third position P3 to the fifth position P5, the second roller 330 can rotate clockwise about the second direction (Y axis).

In FIG. 11 to FIG. 13, it has been described that the first roller 310 and the second roller 330 are rotated in different directions. However, the present inventive concept is not limited thereto. For example, in a first modification shown in FIGS. 14 to 16, the first roller 310 and the second roller 330 can rotate in the same direction.

Figure 14:
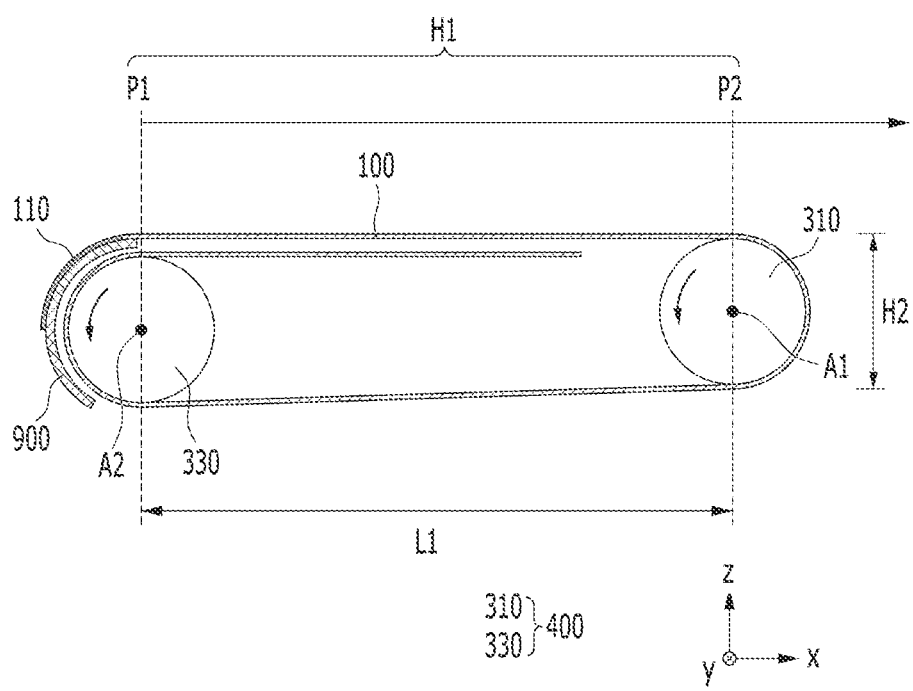
FIG. 14, FIG. 15 and FIG. 16 illustrate an operation of a first modification of the display device of FIG. 11.
Figure 15:
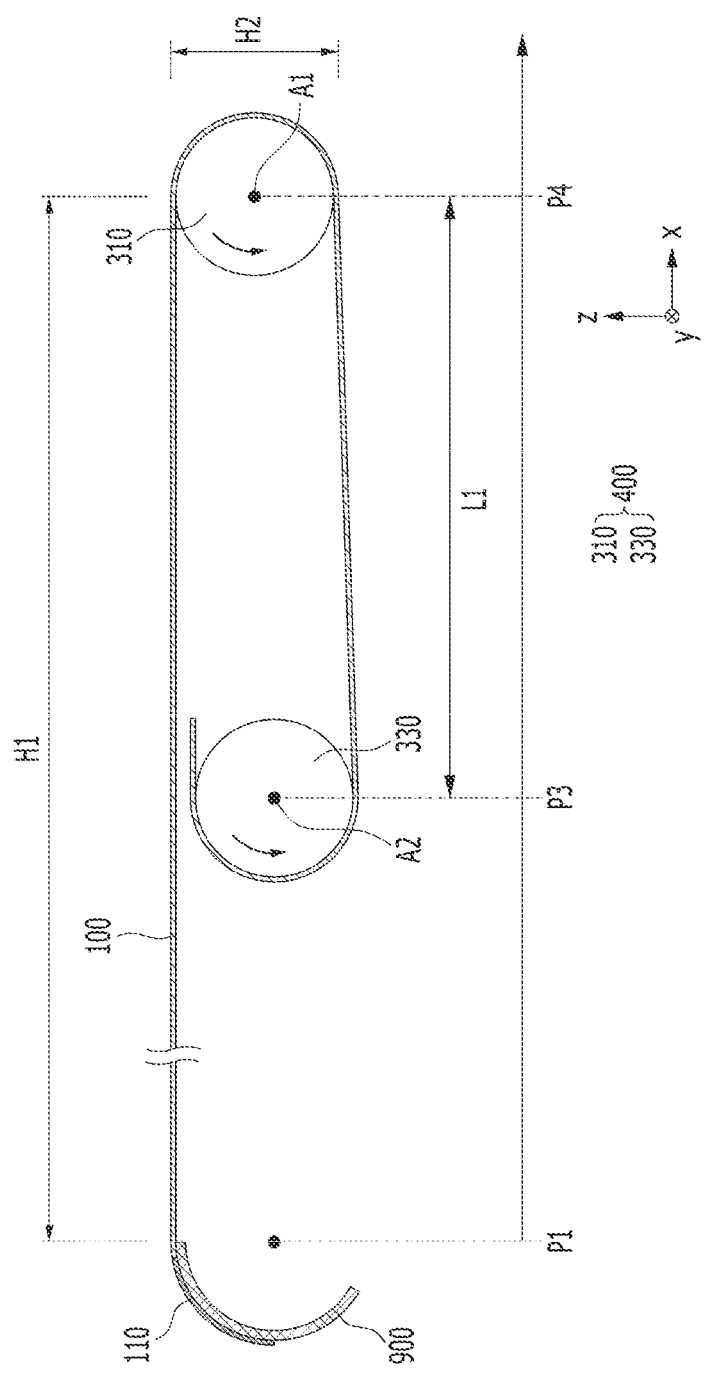
Figure 16:
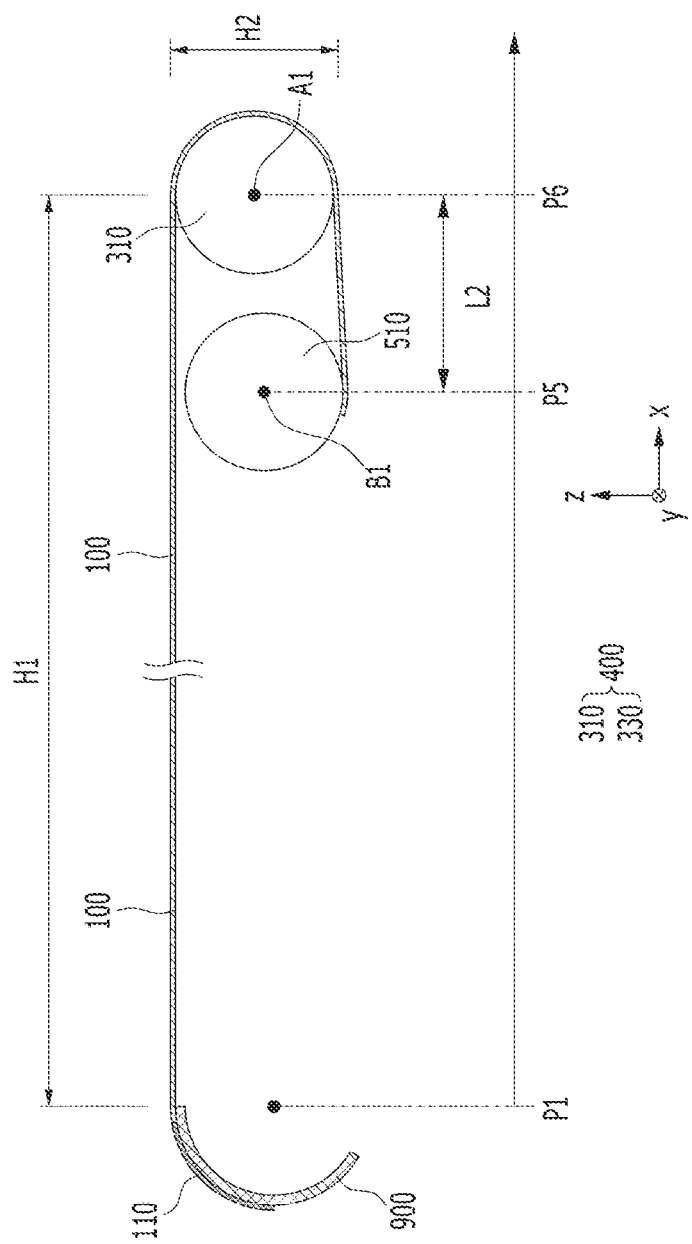

The first modification of FIG. 14 to FIG. 16 is different from the aforementioned exemplary embodiment in that a rotating direction of the second roller 330 is a counterclockwise direction instead of the clockwise direction described above. The configurations other than the second roller 330 which is applicable to the first modification of FIG. 14 to FIG. 16 are the same as those of FIG. 11 to FIG. 13, and thus a detailed description thereof will be omitted.

Hereinafter, a display device according to a second modification will be described with reference to FIG. 17 to FIG. 20. A detailed description related to configurations that are the same as in the aforementioned second exemplary embodiment will be omitted in describing the second modification.

Figure 17:
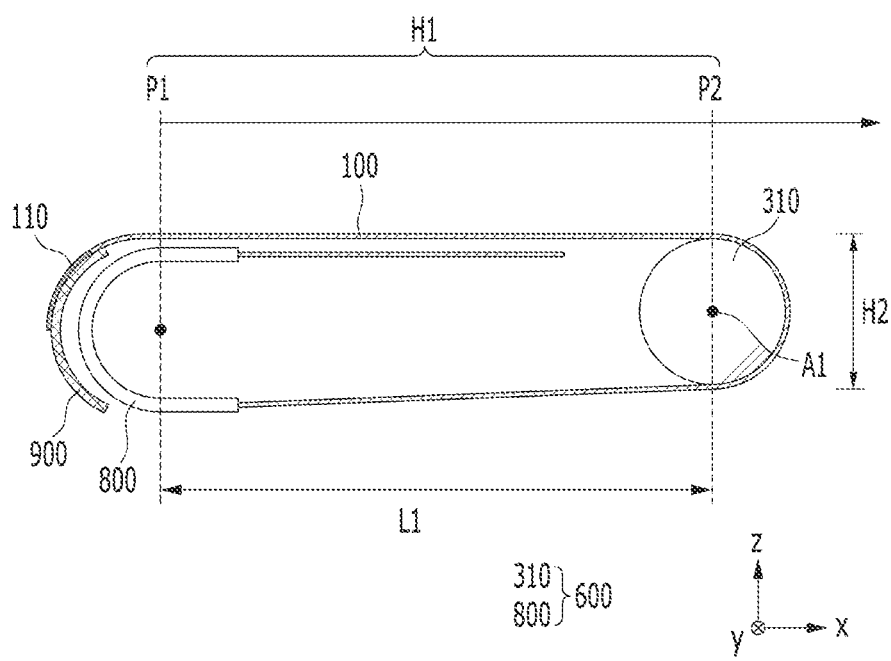
FIG. 17, FIG. 18 and FIG. 19 illustrate an operation of a second modification of the display device of FIG. 11.
Figure 18:
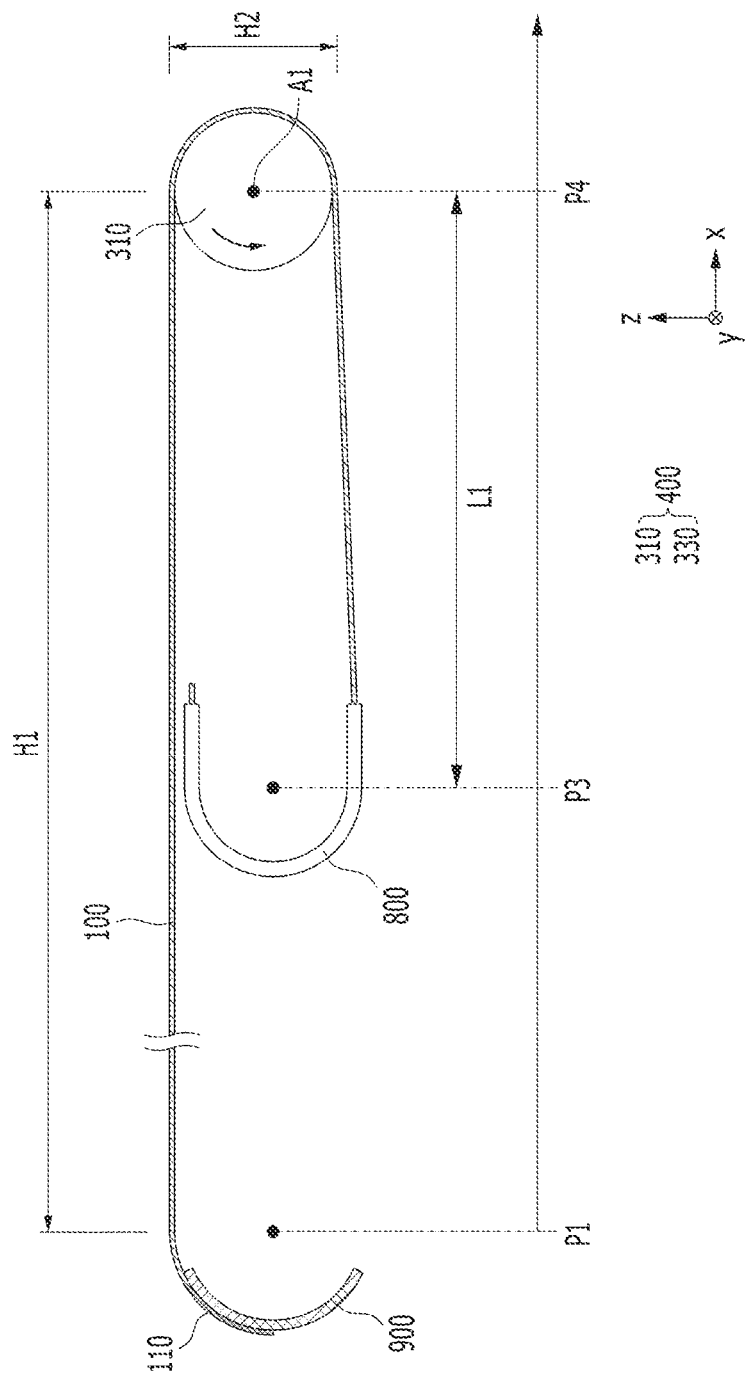
Figure 19:
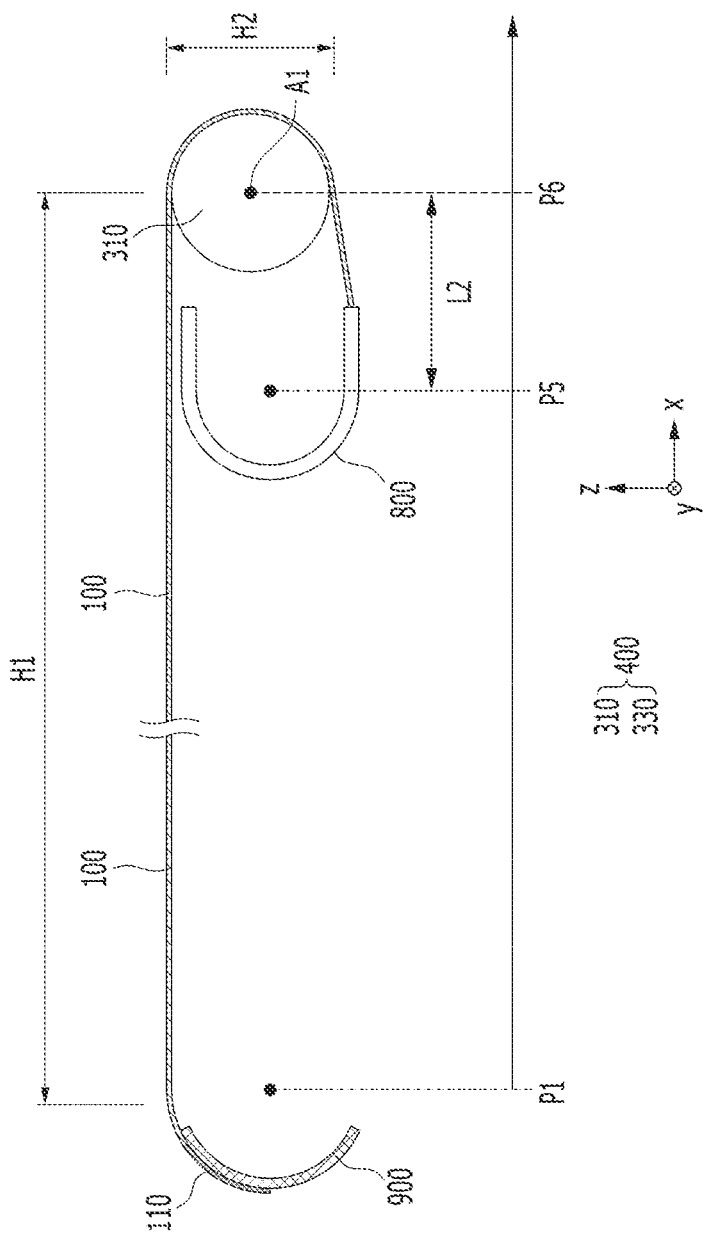
Figure 20:
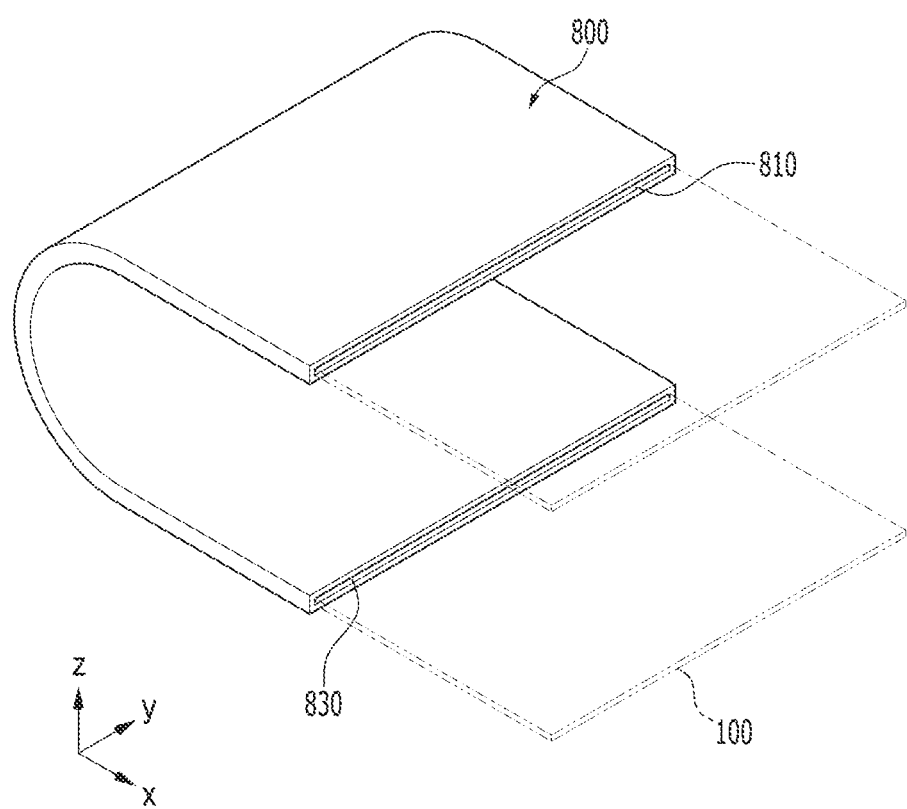
FIG. 20 is a schematic perspective view illustrating a guide unit of FIG. 17.

FIG. 17 to FIG. 19 illustrate an operation of the display device according to the second modification of FIG. 11, and FIG. 20 is a schematic perspective view illustrating a guide unit of FIG. 17.

Referring to FIG. 17 to FIG. 19, a second winder 600 may include a first roller 310 and a guide unit 800. In the present modification, the guide unit 800 may be disposed instead of the second roller 330 of FIG. 11 to FIG. 13.

Referring to FIG. 20, the guide unit 800 may be a tubular member through which the display panel 100 can be extended. In detail, the guide unit 800 may be a tubular member having a hollow cross-section formed at the inside thereof. In this case, the area of the hollow may correspond to the cross-sectional area of the display panel 100. Herein, the cross-section area of the display panel 100 indicates a size of the cross-section of the display panel 100 in which the display panel 100 is cut in a direction parallel to a plane formed in the second direction (Y-axis) and the third direction (Z-axis).

As shown in FIG. 20, the guide unit 800 may have a convex curved surface in the first direction (X-axis). Opposite end portions of the guide unit 800, i.e., opposite end portions through which the display panel 100 can be entered or exited, may be arranged in parallel with the first direction (X-axis), and may be disposed to face the first roller 310.

In the present modification, similar to the second roller 330 of FIG. 11 to FIG. 13, The guide unit 800 can move along the first direction (X-axis) together with the first roller 310, and the distance between the first roller 310 and the guide unit 800 can be adjusted.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

DESCRIPTION OF SYMBOLS

H1 first area
H2 second area
H3 third area
100 display panel
300 first roller unit
310 first roller
330 second roller
350 third roller
500 second roller unit
510 fourth roller
530 fifth roller
550 sixth roller
710 first connection plate
730 second connection plate
900 fixing unit
800 guide unit

What is claimed is:
1. A display device comprising:
a display panel configured to include a first area, and a second area and a third area respectively disposed at opposite sides of the first area in a first direction; a first roller unit configured to wind the second area thereon; and a second roller unit configured to wind the third area of the display panel in an opposite direction to that of the first roller unit, wherein the first roller unit and the second roller unit are separated from each other in the first direction by a distance, the first roller unit includes:
a first roller configured to rotate around a first rotation axis; and a second roller configured to rotate in an opposite direction to that of the first roller around a second rotation axis that is parallel to the first rotation axis in the first direction; and
the first roller unit and the second roller unit are configured to be movable to allow the distance to be adjusted;
wherein the first roller is configured to wind the second area on the first roller around the first rotation axis and the second roller is configured to wind the second area on the second roller around the second rotation axis,
the second area is configured to include a first winding area that is wound around the first roller and a second winding area that is wound around the second roller, and wherein no area of the second area between the first winding area and the second winding area contacts any roller other than the first roller or the second roller.

2. The display device of claim 1, wherein the second area of the display panel is wound on at least one of external circumferential surfaces of the first roller and the second roller.

3. The display device of claim 2, wherein a first ratio which is a ratio of a first length of the second area wound around the external circumferential surface of the first roller to a length of a circumference of the first roller is the same as a second ratio which is a ratio of a second length of the second area wound around the external circumferential surface of the second roller to a length of a circumference of the second roller.

4. The display device of claim 2, wherein a radius of the first roller is a same radius as a radius of the second roller.

5. The display device of claim 2, wherein a radius of the first roller is a different radius from a radius of the second roller.

6. The display device of claim 2, wherein the first roller unit further includes a first connection plate configured to have a first-side end portion fixedly coupled to the external circumferential surface of the second roller, and a second-side end portion coupled to the second area,
wherein the first connection plate is wound on the external circumferential surface of the first roller or the second roller.

7. The display device of claim 2, wherein the first roller unit further includes a third roller configured to rotate in an opposite direction to that of the second roller around a third rotation axis parallel to the first rotation axis and the second rotation axis.

8. The display device of claim 1, wherein the second roller unit includes:
a fourth roller configured to rotate around a fourth rotation axis parallel to the first rotation axis in the first direction; and
a fifth roller configured to rotate in an opposite direction to that of the fourth roller around a fifth rotation axis parallel to the fourth rotation axis in the first direction.

9. The display device of claim 8, wherein the third area is wound on at least one of external circumferential surfaces of the fourth roller and the fifth roller.

10. The display device of claim 9, wherein a third ratio which is a ratio of a length of the display panel wound on the external circumferential surface of the fourth roller to a length of a circumference of the fourth roller is the same as a fourth ratio which is a ratio of a length of the display panel wound on the external circumferential surface of the fifth roller to a length of a circumference of the fifth roller.

11. The display device of claim 9, wherein a radius of the fourth roller is a same radius as a radius of the fifth roller.

12. The display device of claim 9, wherein a radius of the fourth roller is a different radius from a radius of the fifth roller.

13. The display device of claim 9, wherein the second roller unit further includes a second connection plate configured to have a first-side end portion fixedly coupled to the external circumferential surface of the fifth roller, and a second-side end portion coupled to the third area,
wherein the second connection plate is wound on the external circumferential surface of the fourth roller or the fifth roller.

14. The display device of claim 9, wherein the second roller unit further includes a sixth roller configured to rotate in an opposite direction to that of the fifth roller around a sixth rotation axis parallel to the fourth rotation axis and the fifth rotation axis.

* * * * *